US011346645B2

(12) United States Patent
Ji et al.

(10) Patent No.: US 11,346,645 B2
(45) Date of Patent: May 31, 2022

(54) TESTING DEVICE FOR MATERIAL WEAR OF CYCLOIDAL GEAR AND NEEDLE BEARING OF RV REDUCER

(71) Applicant: Beijing University of Technology, Beijing (CN)

(72) Inventors: Shuting Ji, Beijing (CN); Yueming Zhang, Beijing (CN); Yu Yang, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 835 days.

(21) Appl. No.: 16/310,447

(22) PCT Filed: May 28, 2018

(86) PCT No.: PCT/CN2018/088643
§ 371 (c)(1),
(2) Date: Dec. 17, 2018

(87) PCT Pub. No.: WO2018/210350
PCT Pub. Date: Nov. 22, 2018

(65) Prior Publication Data
US 2019/0323814 A1 Oct. 24, 2019

(30) Foreign Application Priority Data

May 19, 2017 (CN) .......................... 201710355086.3

(51) Int. Cl.
*G01M 13/04* (2019.01)
*G01B 5/00* (2006.01)
(Continued)

(52) U.S. Cl.
CPC ............. *G01B 5/0025* (2013.01); *G01B 5/08* (2013.01); *G01M 13/04* (2013.01); *B25J 19/0004* (2013.01); *B25J 19/0095* (2013.01)

(58) Field of Classification Search
CPC ..................................................... G01M 13/04
See application file for complete search history.

(56) References Cited

U.S. PATENT DOCUMENTS 4,760,759 A   8/1988   Blake

FOREIGN PATENT DOCUMENTS

CN   102472368 A   5/2012
CN   103234754 A   8/2013
(Continued)

*Primary Examiner* — Eric S. McCall
(74) *Attorney, Agent, or Firm* — Leonid Kisselev

(57) ABSTRACT

The invention relates to a testing device for material wear of cycloidal gear and needle bearing of RV reducer, comprising: an upper cover (1), a lower cover (2), two sliding shafts (3 and 3'), two connecting shafts (4 and 4'), a driven shaft component (5), two copper sleeves (6 and 6'), two nuts (7 and 7'), two disc springs (8 and 8'), an eccentric shaft component (9), a needle bearing (10), two planetary gears (11 and 11'), two cycloidal gears (12 and 12'), and a motor assembly (13). The device can be installed on various industrial platforms. The motor drives the planetary gear to rotate, and then drives the eccentric shaft to rotate. The first bearing hole of the cycloidal gear fits with the needle bearing and forms a revolute pair with the eccentric shaft. Owning to the eccentric shaft, the cycloidal gears (12 and 12') are driven to swing. The other bearing hole fits with the sliding shaft (3 and 3') and the connecting shaft (4 and 4') to form a loaded rolling friction pair. Then the cycloidal gear drives the sliding shaft to perform reciprocating movement along the track of cavity. The connecting shaft (4 and 4') and the sliding shaft (3 and 3') exert the load on the cycloidal gear (12 and 12') and needle bearing (10) by compressing the disc springs via the nuts. After a specified time of operation, measure the diameter of bearing holes of cycloidal gear and the outer diameter of needle bearing, then evaluate the material wear of the two components. It provides reliable (Continued)

testing data for the selection of material and the determination of heat treatment process of the cycloidal gear and needle bearing. The invention solves the difficult problem for measuring the material wear of cycloidal gear and needle bearing, which are the key components of RV reducer.

5 Claims, 3 Drawing Sheets

(51) Int. Cl.
 *G01B 5/08* (2006.01)
 *B25J 19/00* (2006.01)

(56) References Cited

FOREIGN PATENT DOCUMENTS

| | | |
|---|---|---|
| CN | 104019190 A | 9/2014 |
| CN | 104568428 A | 4/2015 |
| CN | 204828503 A | 12/2015 |
| CN | 105466678 A | 4/2016 |
| CN | 107167056 A | 9/2017 |
| CN | 106195137 B | 10/2018 |

TESTING DEVICE FOR MATERIAL WEAR OF CYCLOIDAL GEAR AND NEEDLE BEARING OF RV REDUCER

CROSS REFERENCE TO RELATED APPLICATION

This application is a national stage application of International application number PCT/CN2018/088643, filed Apr. 13, 2017, titled "A Testing Device for Material Wear of Cycloidal Gear and Needle Bearing of RV Reducer" which claims the priority benefit of Chinese Patent Application No. 201710355086.3, filed on May 19, 2017, which is hereby incorporated by reference in its entirety.

TECHNICAL FIELD

The invention relates to a device and a method for detecting and measuring material wear of cycloidal gear and needle bearing which are the core parts of RV reducer. In particular, the invention relates to measuring wear of high hardness materials, in the field of industrial robot.

BACKGROUND

RV reducer is widely applied in industrial robot joints, and the cycloidal gear is the fundamental part of RV reducer. During operation, the cycloidal gear and needle bearing rotate with high speed and bear high load at contact positions, thus are prone to wear, which affects the control accuracy and service life of industrial robots. For the reasons above, the wear resistance and hardness of cycloidal gear and needle bearing are the key indexes to evaluate the working performance of RV reducer. The test for material wear of cycloidal gear and needle bearing is carried out to provide a test foundation for studying the influence of materials on material wear of cycloidal gear and needle bearing. The development of the test device is of great significance to the selection of material and the determination of heat treatment process for cycloidal gear and needle bearing.

Material wear of cycloidal gear and needle bearing determines the working performance of RV reducer. The rotation speed of eccentric shaft component, the bearing load of cycloidal gear and the mechanism lubrication all affect the wear of cycloidal gear and needle bearing. However, it is difficult to measure the amount of material wear, not to mention to study the effect of influential parameters on the material wear. Therefore, the wear of cycloidal gear and needle bearing can only be obtained on the basis of test measurement.

In order to systematically study the material wear of cycloidal gear and needle bearing of RV reducer under real operating conditions, and the effects of material and heat treatment on wear of cycloidal gear and needle bearing, a set of test equipment and measuring method consist of the main parts of RV reducer with adjustable speed, bearing load, and lubrication condition are needed to measure the material wear of cycloidal gear and needle bearing of RV reducer. However, there is no relevant device currently.

SUMMARY

The invention aims to drive the eccentric shaft component via a motor, and to form a rolling friction pair between a cycloidal gear and a needle bearing of the RV reducer. Rotate the nut to adjust the amount of compression of the disc spring and to exert load on the cycloidal gear and the needle bearing through the sliding shaft and the connecting shaft component. Seal the above components in a sealed cavity comprising an upper cover and a lower cover, and then inject grease to lubricate the internal parts. Adjust the rotating speed of motor, nut position and lubricating grease, after running for a period of time, and measure the changes of inner diameter of bearing hole of cycloidal gear and outer diameter of needle bearing. Change the above parameters, and then measure the material wear of cycloidal gear and needle bearing under different material, heat treatment processes and operation conditions. Accordingly, the influences of related factors on material wear can be studied. Therefore, the invention provides a test basis for the material selection and the determination of heat treatment process of cycloidal gear and needle bearing.

In order to achieve the above objectives, the technique of the invention is as follows: A testing device for material wear of cycloidal gear and needle bearing of RV reducer comprises: an upper cover (1); a lower cover (2); two sliding shafts, i.e., a first sliding shaft (3) and a second sliding shaft (3'); two connecting shafts, i.e., a first connecting shaft (4) and a second connecting shaft (4'); a driven shaft component (5); two copper sleeves, i.e., a first copper sleeve (6) and a second copper sleeve (6'); two nuts, i.e., a first nut (7) and a second nut (7'); two disc springs, i.e., a first disc spring (8) and a second disc spring (8'); an eccentric shaft component of RV reducer (9); a needle bearing of RV reducer (10); two planetary gears of RV reducer, i.e., a first planetary gear (11) and a second planetary gear (11'); two cycloidal gears of RV reducer, i.e., a first cycloidal gear (12) and a second cycloidal gear (12'); and a motor component (13). The test is performed using the original core components of the RV reducer, including the cycloidal gears (12 and 12'), the planetary gears (11 and 11'), the needle bearing (10), and the eccentric shaft component (9), to simulate the real working condition of the RV reducer. Install the eccentric shaft component (9), the cycloidal gears (12 and 12'), the sliding shafts (3 and 3'), the connecting shafts (4 and 4'), and the needle bearing (10) of the RV reducer into the sealed cavity comprised by the upper cover (1) and the lower cover (2), and then inject the lubricating grease into the cavity.

The two planetary gears (11 and 11') are symmetrically arranged relative to the output shaft of the motor, one of the planetary gears (11) is connected to the eccentric shaft via a spline, two eccentric circles with a phase difference of 180° are arranged on the eccentric shaft and fits with the bearing holes of two cycloidal gears, respectively. There are two centrosymmetric bearing holes (the bearing hole 1 and the bearing hole 2) distributed on the cycloidal gears. As mentioned above, the bearing hole 1 forms a revolute pair with the eccentric shaft via the needle bearing, and the bearing hole 2 forms a revolute pair with the sliding shaft (3 and 3') and the connecting shaft (4 and 4'). The nuts (7 and 7') and the disc springs (8 and 8') are arranged at the end of the sliding shafts. The nuts can be rotated to adjust the compression amount to exert load on the cycloidal gear and the needle bearing. Two copper sleeves (6 and 6') support the shell of the cavity and the two sliding shafts (3 and 3'), and the sliding shafts can move back and forth along a track of the shell.

The two planetary gears (11 and 11') are arranged symmetrically; one planetary gear (11) is used to drive the eccentric shaft (9) to rotate; the other planet gear (11') is used to balance the forces. In addition, the two cycloidal gears (12 and 12'), the two sliding shafts (3 and 3'), the two connecting shafts (4 and 4'), the two nuts (7 and 7'), and the two disc springs (8 and 8') are all arranged symmetrically relative to the eccentric shaft. According to the stress characteristics of eccentric shaft, a tapered roller bearing is used as a support between the eccentric shaft and the frame, and the needle bearing is used as a support between the eccentric shaft and the bearing hole of cycloidal gear. The other bearing hole of the cycloidal gear and the connecting shaft are also supported by a needle bearing.

The motor drives the two planetary gears (11 and 11') to rotate, and then drive the eccentric shaft (9) to rotate, and thus drive the cycloidal gears (12 and 12') to swing. The cycloidal gears (12 and 12') also form revolute pairs with the sliding shafts (3 and 3'), and drive the sliding shafts to reciprocate. Adjust the position of the nuts (7 and 7') located at the end of the sliding shaft to change the amount of compression of the disc springs (8 and 8'), so that the load applied to the cycloidal gear and the needle bearing can be adjusted. During the entire movement process of the device, a slider-crank mechanism is comprised by the eccentric shaft component (9), the cycloidal gears (12 and 12'), and the sliding shaft (3 and 3').

Under the given conditions, after a long period of operation, the diameter of the bearing hole of cycloidal gear and the outer diameter of the needle bearing are measured, thus the amount of material wear of the cycloidal gear and the needle bearing are determined. The relationship between the preload amount of nut and the load among eccentric shaft, the cycloidal gear, and the needle bearing is studied. Adjust the nut position and motor rotation speed, and then check the amount of material wear of the cycloidal gear and the needle bearing. Accordingly, the influence of load and rotation speed on material wear of the cycloidal gear and the needle bearing can be derived. Then repeat the test process with different material and heat treatment process of the cycloidal gear and the needle bearing. Thus, the influence of material, heat treatment process, rotational speed, load, and lubrication on the material wear of the cycloidal gear and the needle bearing can be obtained.

The invention has the following advantages:

(1) The application provides a testing device for material wear of cycloidal gear and needle bearing of RV reducer. The original core components of the RV reducer, such as the cycloidal gear, the eccentric shaft, the needle bearing and the planetary gear, are adopted to perform the test. Thus, the actual operating conditions of the RV reducer can be simulated, and the material wear of the cycloidal gear and the needle bearings can be measured. Previously, the material wear can only be measured by using the entire RV reducer for testing. For the reasons above, this method is more convenient, fast, and practical. It also provides the test equipment and the wear parameters of cycloidal gear and needle bearing of RV reducer for manufacturer.

(2) The invention uses a servo motor to drive the planetary gear to rotate, which then drives the eccentric shaft to rotate, then drives the cycloidal gear to swing, then drives the connecting shaft into the reciprocating motion. In order to apply a load to the cycloidal gear and the needle bearing, the invention adjusts the compression amount of the disc spring by turning the nuts, and then the cycloidal gear and the needle bearing are loaded through the sliding shaft and the connecting shaft. Therefore, the invention can not only ensure a real operational state of RV reducer, but also exert the load conveniently and quickly.

(3) The invention uses a servo motor; thus, the rotating speed can be adjusted. The wear test can be conducted on two cycloidal gears simultaneously, so it's more convenient and cost saving.

(4) The invention can measure the material wear of cycloidal gear and needle bearing with different material and different heat treatment processes. Thus, the wear rules can be obtained. It provides the test basis for the selection of material and the determination of heat treatment process of cycloidal gear and needle bearing.

(5) The eccentric shaft component, cycloidal gear, sliding shaft, connecting shaft and needle bearings of the RV reducer are sealed in the cavity comprised by the upper cover and lower cover. The special lubricating grease can be injected in it. Thus, the invention can be applied to simulate the real operating condition of RV reducer. Besides, the invented device is easy to install and can be installed on various industrial platforms.

DETAILED DESCRIPTION OF THE IMPLEMENTATION

Combined with the composition of the test device and the assembly diagram, the working principle and measuring method of the testing device is described in detail in the following. Reference is made to the accompanying drawings in which like references indicates similar elements, and in which is shown by way of illustration, specific embodiments in which the invention may be practiced. These embodiments are described in sufficient detail to enable those skilled in the art to practice the invention. In other instances, well-known circuits, structures, and techniques have not been shown in detail in order not to obscure the understanding of this description. The following detailed description is, therefore, not to be taken in a limiting sense, and the scoop of the invention is defined only by the appended claims.

Figure 1:
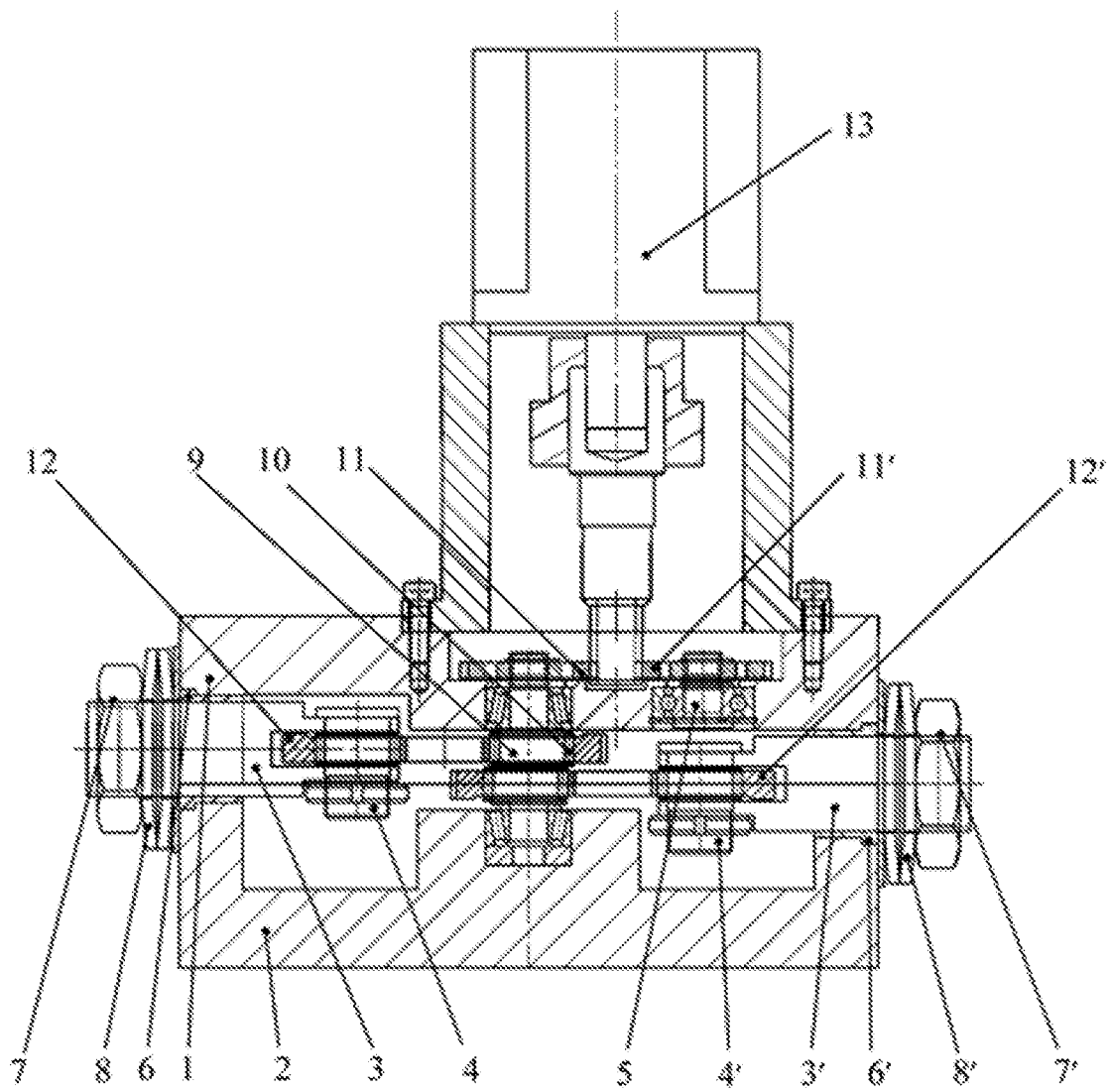
FIG. 1 is a schematic diagram of composition and assembly of the test equipment for the invention.

The invention is applied to measure material wear of the two inner bearing holes of the cycloidal gear and the needle bearing under high speed and high load conditions as shown in FIG. 1. The original core components of RV reducer are applied in this device, including cycloidal gear (12 and 12'), eccentric shaft (9), needle bearing (10), planetary gear (11 and 11') and so on. These parts are sealed in a cavity comprised by the upper cover (1) and the lower cover (2) (see FIG. 1). The special lubricating grease can be injected to the cavity. This can be used to simulate the real operation condition of RV reducer.

During the operation process, the servo motor shown in FIG. 1 drives the two planetary gears (11 and 11') to rotate, wherein the first planetary gear (11) drives the eccentric shaft (9) to rotate through the spline. The two eccentric circles on the eccentric shafts (phase difference is 180°) drive two cycloidal gears (12 and 12') to do plane motion, respectively. The two cycloidal gears (12 and 12') are arranged symmetrically relative to the eccentric shaft. In this way, the force can be balanced, and the material wear of two cycloidal gears and needle bearings can be measured as well.

Figure 2:
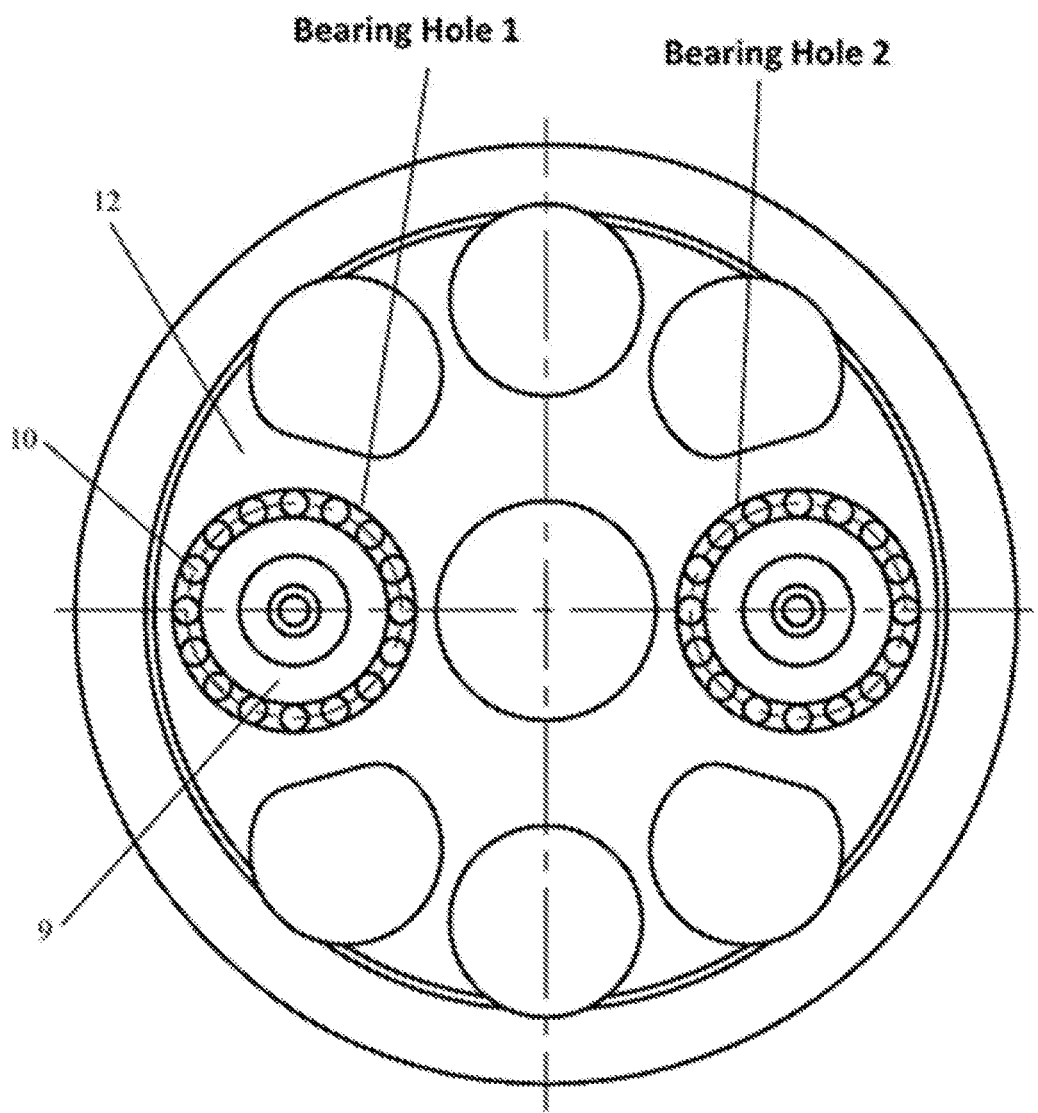
FIG. 2 is a schematic diagram of the cycloidal gear and needle bearing.
Figure 3:
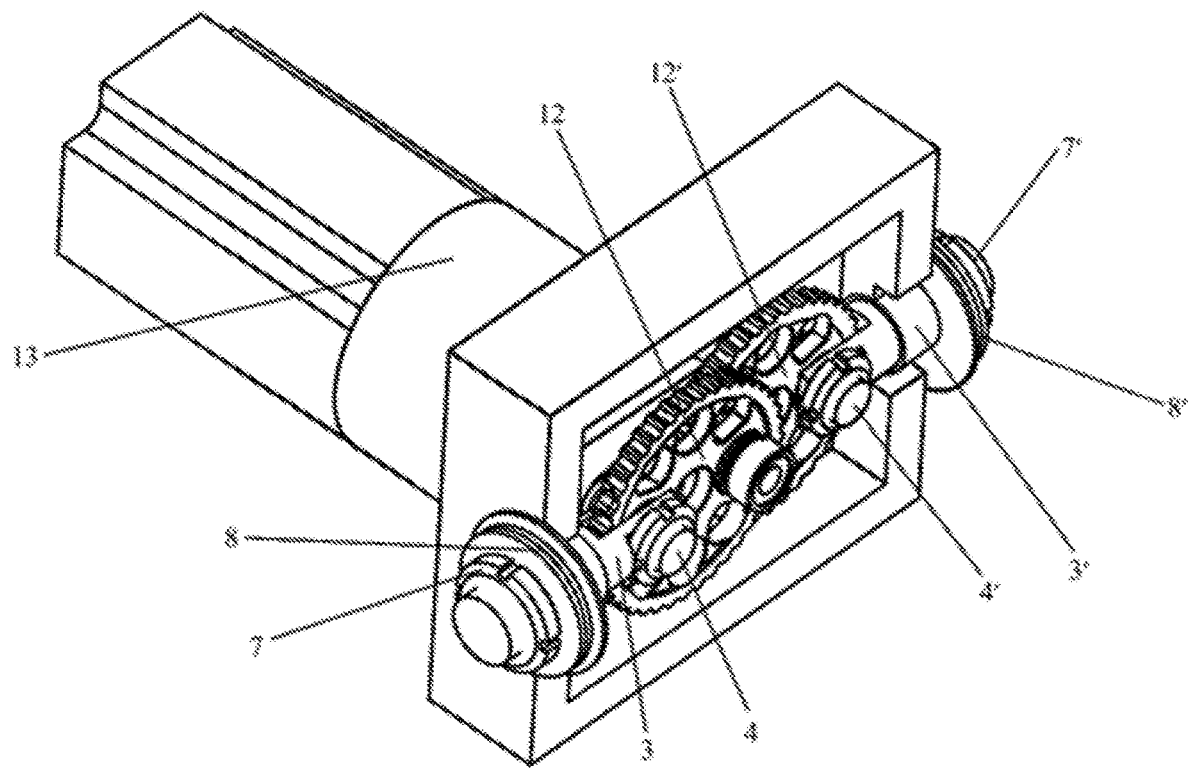
FIG. 3 is a 3D view of the test device.
Figure 4:
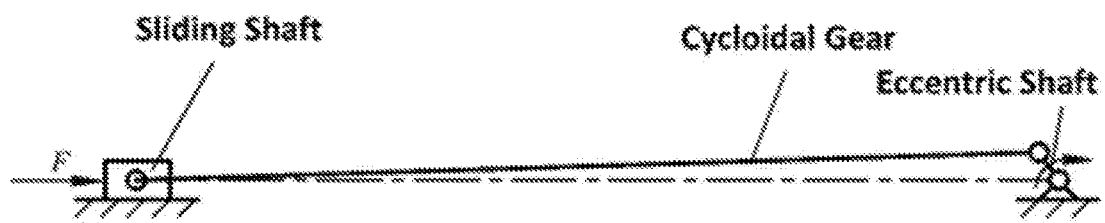
FIG. 4 is a mechanism motion diagram of the test device.

There are two centrosymmetric bearing holes (bearing hole 1 and bearing hole 2) distributed on the cycloidal gear, as shown in FIG. 2. The bearing hole 1 on the cycloidal gear fits with the eccentric shaft via the needle bearing, thus they form a rolling friction pair. The bearing hole 2 on the cycloidal gear fits with the connecting shaft (4 and 4') and drives the sliding shafts (3 and 3') into a reciprocating motion along the track of the cavity. The relative position among the eccentric shaft, the cycloidal gear, the needle bearing, the connecting shaft, and the sliding shafts are shown in FIG. 3. According to the relative motion relations among these components, the mechanism motion diagram is shown in FIG. 4. The rotation of eccentric shaft is equivalent to that of crank shaft. The eccentric shaft forms a revolute pair with the bearing hole 1 of the cycloidal gear via the needle bearing. The connecting rod in FIG. 4 is equivalent to the cycloidal gear. The other bearing hole on the cycloidal gear forms the revolute pair with the connecting shafts (4 and 4') and the sliding shafts (3 and 3'). The cycloidal gear is driven to do the plane motion, and drives the sliding shafts (3 and 3') to move back and forth (reciprocating motion) along the track inside the cavity. Nuts (7 and 7') are mounted at the end of the sliding shafts. Compression amount of disc springs (8 and 8') are increased by tightening the nuts, so that the loads exerted on the sliding shafts (3 and 3') are increased. Correspondingly, the load between the cycloidal gear and the needle bearing is increased.

By increasing the rotation speed of servo motor, and tightening the nuts, the device can be operated under high speed and high load. After a long period of operation, the diameter of the bearing hole of the cycloidal gear and the outer diameter of the needle bearing are measured, thus the material wear of the cycloidal gear and needle bearing of a RV reducer can be measured. In the specific implementation process, the invention can be applied to measure the material wear of cycloidal gear and the needle bearing under the condition of different materials and different heat treatment processes. Thus the wear law of the material can be obtained. The results can be applied as the test basis for the selection of material and the determination of heat treatment process of cycloidal gear and needle bearing of RV reducer.

What is claimed is:

1. A testing device for material wear of cycloidal gear and needle bearing of RV reducer, comprising: an upper cover (1); a lower cover (2); two sliding shafts, i.e., a first sliding shaft (3) and a second sliding shaft (3'); two connecting shafts, i.e., a first connecting shaft (4) and a second connecting shaft (4'); a driven shaft component (5); two copper sleeves, i.e., a first copper sleeve (6) and a second copper sleeve (6'); two nuts, i.e., a first nut (7) and a second nut (7'); two disc springs, i.e., a first butterfly spring (8) and a second disc spring (8'); an eccentric shaft component of RV reducer (9); a needle bearing of RV reducer (10); two planetary gears of RV reducer, i.e., a first planetary gear (11) and a second planetary gear (11'); two cycloidal gears of RV reducer, i.e., a first cycloidal gear (12) and a second cycloidal gear (12'); and a motor assembly (13);

wherein the upper cover (1) and the lower cover (2) form a sealed cavity, the two cycloidal gears of RV reducer, the needle bearing of RV reducer (10), the eccentric shaft component of RV reducer (9), the two sliding shafts, and the two connecting shafts are installed in the cavity; wherein special lubricating grease can be injected in the cavity, wherein the motor assembly (13) drives the two planetary gears (11 and 11') to rotate, which are arranged symmetrically to an output shaft of the motor; wherein the first planetary gear (11) drives the eccentric shaft (9) to rotate; wherein the second planetary gear (11') is used to balance forces; wherein two eccentric circles with a phase difference of 180° are arranged on the eccentric shaft (9) and fit with the two bearing holes of cycloidal gears respectively; wherein there are two centrosymmetric bearing holes distributed on the cycloid gear; wherein one of the bearing hole forms a revolute pair with the eccentric shaft via the needle bearing, and the other bearing hole forms a loaded rolling friction pair with the sliding shaft (3 and 3') and the connecting shaft (4 and 4'); wherein the two cycloidal gears are symmetrically arranged to the eccentric shaft, to be beneficial to force balance; wherein the nuts (7 and 7') and disc springs (8 and 8') are arranged on the ends of the two sliding shafts, which are symmetrically distributed to the eccentric shaft; wherein a load is exerted to the device by the compression of the disc spring; wherein the two copper sleeves support the shell of the cavity and the two sliding shafts, so that the sliding shafts can move back and forth along the track of the shell.

2. A testing device for material wear of cycloidal gear and needle bearing of RV reducer, according to claim 1, wherein: the motor assembly (13) drives the two planetary gears (11 and 11') to rotate, the first planetary gear (11) drives the eccentric shaft (9) to rotate; one bearing hole of the cycloidal gear forms a revolute pair with the eccentric shaft (9), thus the rotation of cycloidal gear is equivalent to the rotation of crank around the eccentric shaft (9); the other bearing hole of the cycloidal gear forms a revolute pair with the sliding shafts (3 and 3') and the connecting shafts (4 and 4'); the cycloidal gear acts as a swing rod and drives the sliding shaft to move back and forth along the track; the cycloidal gears (12 and 12') and the needle bearing (10) are loaded by the compression of the disc springs (8 and 8') through the nuts (7 and 7') at the end of the sliding shaft. After operation, the diameter of the bearing holes of cycloidal gear and the outer diameter of needle bearing (10) are measured to determine the material wear condition of the two components.

3. A testing device for material wear of cycloidal gear and needle bearing of RV reducer according to claim 1, wherein: the motor assembly (13) comprises a servo motor, the rotation speed of the eccentric shaft (9) is adjustable, thus the material wear of the cycloidal gear (12 and 12') and the needle bearing (10) under different rotational speeds can be studied; the compression amount of the disc spring (8 and 8') can be adjusted by changing the position of nuts (7 and 7'), thereby the load acted on the system can be changed; therefore, the material wear of cycloidal gear and the needle bearing under different load conditions can be studied.

4. A testing device for material wear of cycloidal gear and needle bearing of RV reducer according to claim 1, comprising: lubricating grease is injected in the sealed cavity to ensure the testing condition is equivalent to the actual working conditions of RV reducer.

5. A testing device for material wear of cycloidal gear and needle bearing of RV reducer according to claim 1, wherein the key components of the device, e.g., the eccentric shaft (9), the cycloidal gears (12 and 12'), planetary gears (11 and 11') and the needle bearing (10) of RV reducer are from the original key components of RV reducer; therefore, the simulation of material wear of the cycloidal gear and the needle bearing is conducted under realistic operational conditions of RV reducer.

* * * * *